Figure 1:
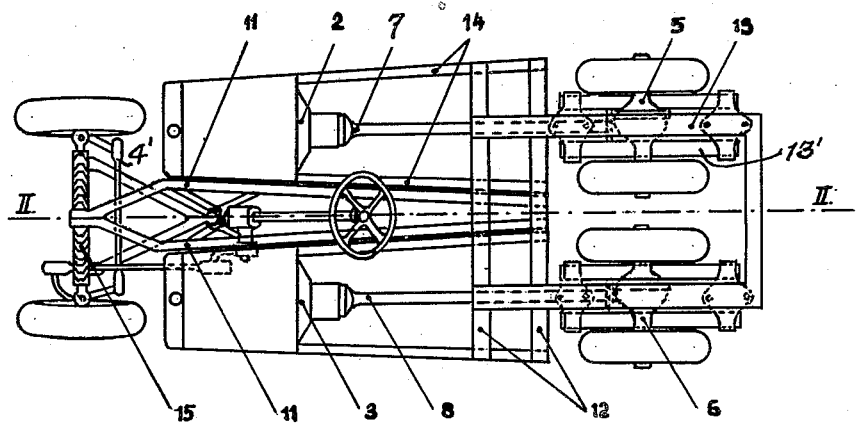

Feb. 11, 1936.  H. R. M. G. SMEETS  2,030,548

TRUCK OR TRACTOR WITH TWO REAR AXLES

Filed June 16, 1933

H. R. M. G. Smeets
Inventor

By: Glascock Downing &Seebold
Attys.

Patented Feb. 11, 1936

2,030,548

UNITED STATES PATENT OFFICE

2,030,548

TRUCK OR TRACTOR WITH TWO REAR AXLES

Herman René Marie Gerard Smeets, Roermond, Netherlands

Application June 16, 1933, Serial No. 676,185
In the Netherlands July 1, 1932

3 Claims. (Cl. 180—22)

My invention relates to a truck or tractor with two rear axles each of which is provided with at least two road wheels and each of these rear axles being driven by a separate internal combustion engine and the two engines being arranged at different sides of the longitudinal central plane of the vehicle.

One drawback appertaining to very high powered tractors consists in their very high initial cost. This is due to the small market for these high powered tractors so that they cannot be manufactured in very large series as is the case with mass production of passenger motor cars and small trucks. Another drawback is due to the very high cost if by normal wear or by collision or neglect by the workmen, various parts may have to be replaced.

The purpose of my present invention is to decrease the initial expense as well as upkeep by using for the construction of a truck or a tractor as many parts of a type which is built in large series. Preferably the parts are chosen of a type which is used in a very great number of passenger cars and light trucks in the country in which the heavy truck or tractor is to be used.

Motor vehicles are known in which the two rear axles, each of which is driven by a separate engine, are placed behind each other. For this purpose universal joints are arranged at the rear of each transmission one of which is connected by a short propeller shaft with the foremost rear axle and the other by a long propeller shaft with the hindmost rear axle. When driving over uneven ground the two rear axles must be adapted to move up and down independently of each other over a relative great distance without the possibility of the propeller shaft which drives the rearmost rear axle touching the foremost rear axle housing. This drawback will certainly be present in the known vehicle, unless measures are taken in order to prevent this, which measures necessarily cause a complication of parts, while at the same time by the arrangement of the two rear axles behind each other several parts must be made in a different way.

The object of the present invention is to provide a truck or a tractor with two engines at different sides of the longitudinal central plane of the vehicle for driving the two rear axles which vehicle is to be constructed in such a way that as many parts as possible of light cars which are manufactured in large series may be applied and in which it is not necessary to take special measures in order to prevent the two rear axles interfering with each other with their upward and downward movements.

This object is attained according to my invention by the feature that each rear axle with its road wheels is arranged at the same side of the longitudinal central plane of the vehicle as its corresponding engine.

By a construction of this kind several advantages are obtained. In the first place it has appeared that in applying complete engines, clutches, transmissions, front axles, front springs, frames, rear axles, and other details of a type which is manufactured in very large series and of which the parts may be obtained practically everywhere, a truck tractor may be built for about the half of the price which has to be paid for a vehicle with one heavy engine of the same power. Further the costs for upkeep are decreased to a very low point by the very cheap parts, while even the substitution of a complete engine is not expensive. The low price of the engine makes it also possible to have a complete spare engine in stock.

Another advantage is that the user is no longer dependent on the stock of spare parts of any one dealer as these parts are obtainable practically everywhere. Moreover repairs may be made by every local dealer familiar with the type. Therefore it is never necessary to have the car out of use for repairs during any long time.

Further the cost of upkeep is decreased as by means of the independent drive on the rear axles it is possible, when driving an unloaded car or when driving without a trailer, to stop one of the engines, so that the working engine is loaded in a less unfavourable way than would be the case with a single engine of great power. Finally reliability is increased as in case of an unexpected failure of one of the engines it is still possible to have the car driven by the other engine but at a lower speed.

By the side by side arrangement of the engines the front part of the frame becomes very broad so that, in view of the space required by the angle of deflection of the steering wheels, the front axle cannot be arranged in the normal way without causing an undesired overall width of the car. In order to make this overall width independent of the track of the front wheels the smallest radial distance from the centre of the front wheels to the radiator, a chassis beam or the engines under each practical angle of deflection may according to my invention be such that this distance is greater than the radius of the front wheels while the length of the front axle is such that at the greatest angle of deflection of the steering wheels the distance between the planes which are parallel to the longitudinal central axis of the vehicle and going through the points of these wheels which are nearmost to this longitudinal axis is smaller than the width of the frame adjacent to the engines. It is remarked that by "steering wheels" is to be understood the wheels complete with tires, so that the length of the front axle is determined by the planes going through the innermost points of the tires.

By this construction it is possible that the outer faces of the front wheels are arranged within the width of the vehicle which is determined by the side frame members.

In the accompanying drawing a form of a tractor according to my invention is illustrated by way of example, in which:

Figure 1 is a view of a truck according to the invention, and

Figure 2:
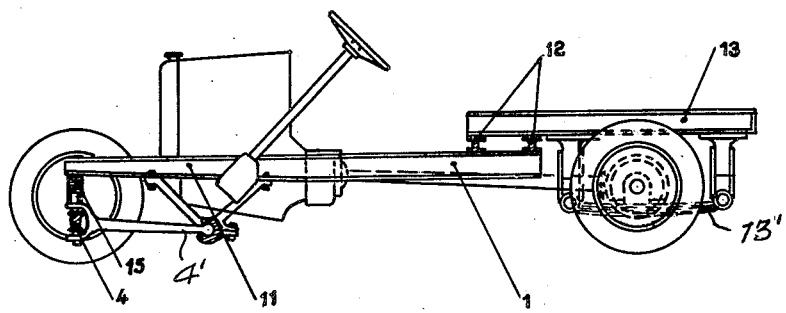

Figure 2 a vertical section taken on the line II—II of Figure 1.

In the illustrated example the frame 1 is provided with two motor vehicle units 2 and 3 which each comprise a standard frame 14 on which is arranged a radiator, an engine, a propeller shaft, a clutch, a transmission and a rear axle. The two rear axles 5 and 6, are driven independently of each other, by means of the propeller shafts 7 and 8, respectively through the engines 2 and 3.

In order to keep the production costs of the tractor as low as possible the two motor vehicle units are chosen of a type which is built in large series such as the Ford. Also the rear axles 5 and 6 may be made from standard axle housings each of which contain the normal reduction gear and differential mechanism. Only the ends of the axle housings are shortened, in order to obtain two short rear axles which are arranged in relative alignment. The frame 1 consists of a front part 11 which at the rear end is connected by means of two cross beams of I-section 12 with the rear frame 13 which by means of springs 13' is supported by the rear axles 5 and 6. At each side of the main front frame 11 one of these frames 14 is fixed, while the rear end of each frame is connected with the cross beams 12 of the main frame. Also the normal engine hoods may be applied and the rear axles 5 and 6 are connected by means of ordinary torque tubes, propeller shafts and universal joints with the transmissions of the motor units 2 and 3. These rear axles must be so short that replacement of the inner wheels or rims is possible.

The front frame 11 consists essentially of two beams which enclose an angle corresponding with the taper of the stock frames 14. At the front end the two beams approach each other and are connected together to the front spring 15 which is supported by the steerable front axle 4. This front spring and front axle are also of the standard kind, as are the radius rod and most parts of the steering mechanism 4'.

The relatively great distance between the two engines causes such a width of the front part of the frame adjacent to the radiators that it is not possible to arrange the front axle under the radiators in the normal way without—also with a view to the necessary angle of deflection of the front wheels—an undesired overall width being caused. Consequently it is desired to so arrange the front axle that the front wheels are in front of the radiators. Therefore the wheels may be placed nearer to each other so that the normal front axle, front spring and front radius rod may be applied.

It is evident that under the side by side arrangement of the engine and rear axles also an arrangement is understood in which the engines and rear axles are slightly staggered, as by this arrangement the same effect is obtained.

It follows from the above that by simple means very great technical advantages are obtained.

I claim:—

1. A truck comprising a main frame composed of a front part and a rear part, a steerable unit supporting the forward end of the front part, and two motor vehicle units supported at opposite sides of the front part of the frame and each including a frame, a propelling shaft and a rear axle and ground engaging and propelling wheels on each rear axle disposed under and in a position to support the rear part of the main frame.

2. A truck as claimed in claim 1, in which the rear part of the main frame includes side members respectively arranged medially above the propelling axles of the motor vehicle units.

3. A truck as claimed in claim 1, in which the rear part of the frame includes side members positioned medially over the rear axles of the motor vehicle units and between the wheels thereon while the rear axles are in addition arranged in transvere alignment with each other.

HERMAN RENÉ MARIE
GERARD SMEETS.